US011597049B2

(12) United States Patent
Li et al.

(10) Patent No.: US 11,597,049 B2
(45) Date of Patent: Mar. 7, 2023

(54) NANOFLUID MINIMUM QUANTITY LUBRICATION GRINDING DEVICE OF ULTRASONIC VIBRATION ASSISTED GRINDING FLUID MICRO-CHANNEL INFILTRATION

(71) Applicant: QINGDAO UNIVERSITY OF TECHNOLOGY, Shandong (CN)

(72) Inventors: Changhe Li, Qingdao (CN); Teng Gao, Qingdao (CN); Yanbin Zhang, Qingdao (CN); Min Yang, Qingdao (CN); Dongzhou Jia, Qingdao (CN); Xianpeng Zhang, Qingdao (CN); Yiliang Yang, Qingdao (CN); Zhaorong Bing, Qingdao (CN); Naiqing Zhang, Qingdao (CN); Han Zhai, Qingdao (CN); Yali Hou, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 988 days.

(21) Appl. No.: 16/344,158

(22) PCT Filed: Dec. 4, 2018

(86) PCT No.: PCT/CN2018/119226
§ 371 (c)(1),
(2) Date: Apr. 23, 2019

(87) PCT Pub. No.: WO2019/109920
PCT Pub. Date: Jun. 13, 2019

(65) Prior Publication Data
US 2020/0023485 A1    Jan. 23, 2020

(30) Foreign Application Priority Data

Dec. 6, 2017  (CN) .......................... 2017112780671
Dec. 6, 2017  (CN) .......................... 2017216813792

(51) Int. Cl.
    B24B 1/04      (2006.01)
    B24B 41/06     (2012.01)
    B24B 55/02     (2006.01)

(52) U.S. Cl.
    CPC .............. B24B 1/04 (2013.01); B24B 41/068 (2013.01); B24B 55/02 (2013.01)

(58) Field of Classification Search
    CPC ....... B24B 55/02; B24B 55/03; B24B 55/045; B24B 55/12; B24B 27/00; B24B 27/003;
    (Continued)

(56) References Cited

U.S. PATENT DOCUMENTS 2,353,891 A * 7/1944 Gruntorad ................. B25B 1/22
                                                          451/365
3,273,879 A * 9/1966 Floren .................. B23Q 1/5443
                                                           269/61

FOREIGN PATENT DOCUMENTS

CN    102152175 A    8/2011
CN    104325364 A    2/2015
(Continued)

OTHER PUBLICATIONS

CN 107378655—Machine Translation (Year: 2017).*
(Continued)

*Primary Examiner* — Monica S Carter
*Assistant Examiner* — Alberto Saenz
(74) *Attorney, Agent, or Firm* — Oliff PLC

(57) ABSTRACT

A NMQL grinding device of ultrasonic vibration assists grinding fluid micro-channel infiltration, and solves the problem that nanofluids are difficult to fully infiltrate the grinding zone in the prior art. Fully considers the impact of thickness of undeformed grinding debris on the grinding process and the lubrication state of single grains during material removal in the grinding process, the advantage of (Continued)

ultrasonic vibration assistance on improving the lubri-cooling performance of NMQL grinding is effectively achieved. According to the solution, the device includes an ultrasonic vibration mechanism capable of adjusting the spatial position of ultrasonic vibrators, the mechanism being arranged on a worktable; a NMQL grinding mechanism, arranged above a workpiece fixing table; and a grinding force measuring mechanism, including a dynamometer and a grinding force controller connected with the dynamometer, the dynamometer being arranged at the bottom of the ultrasonic vibration mechanism.

8 Claims, 12 Drawing Sheets

(58) Field of Classification Search
CPC ............ B24B 27/0046; B24B 27/0069; B24B 27/0084; B24B 25/00; B24B 1/04; B24B 41/068; B23Q 16/001; B23Q 1/035
USPC ............ 451/53; 269/55, 56, 71, 73, 74, 309
See application file for complete search history.

(56) References Cited

FOREIGN PATENT DOCUMENTS

| | | | | |
|---|---|---|---|---|
| CN | 105666254 A | | 6/2016 | |
| CN | 106181596 A | * | 12/2016 | ............... B24B 1/04 |
| CN | 106181596 A | | 12/2016 | |
| CN | 106736992 A | | 5/2017 | |
| CN | 107336086 A | | 11/2017 | |
| CN | 107378655 A | * | 11/2017 | ............... B24B 1/04 |
| CN | 107378655 A | | 11/2017 | |
| CN | 107855836 A | | 3/2018 | |
| CN | 207915123 U | | 9/2018 | |
| WO | 2006/137453 A1 | | 12/2006 | |

OTHER PUBLICATIONS

CN 106181596—Machine Translation (Year: 2016).*
Feb. 27, 2019 International Search Report issued in International Patent Application No. PCT/CN2018/119226.
Feb. 27, 2019 Written Opinion of the International Searching Authority issued in International Patent Application No. PCT/CN2018/119226.

* cited by examiner

NANOFLUID MINIMUM QUANTITY LUBRICATION GRINDING DEVICE OF ULTRASONIC VIBRATION ASSISTED GRINDING FLUID MICRO-CHANNEL INFILTRATION

FIELD OF THE INVENTION

The invention relates to the field of grinding, in particular to a nanofluid minimum quantity lubrication (NMQL) grinding device of ultrasonic vibration assisted grinding fluid micro-channel infiltration.

BACKGROUND OF THE INVENTION

With the continuous development of broad machining fields of machinery, automobiles, aerospace, optical components and the like, a large number of parts with increasingly high performance requirements have emerged, and precision and ultra-precision machining technologies have become increasingly important. The conventional grinding process produces large grinding force and high grinding temperature, which aggravates the wear of a grinding wheel and the damage of a machined surface, and seriously restricts the machining accuracy and machining efficiency of the parts, so a new grinding process is urgently needed to solve such problems. Ultrasonic vibration assisted NMQL grinding is one of the methods to solve such problems.

Ultrasonic vibration grinding is a composite machining method based on vibration theory and cutting theory. This grinding method is fundamentally different from previous grinding in that high-frequency electric oscillation signals generated by an ultrasonic generator are converted into ultrasonic frequency mechanical vibration by an ultrasonic transducer during grinding, and the amplitude of ultrasonic vibration is amplified by a horn to drive a tool grinding wheel to generate a vibration of a corresponding frequency, so that the tool periodically cuts a workpiece, that is, the tool grinding wheel also produces high-frequency vibration at high-speed rotary grinding. When the ultrasonic vibration is applied to a process system, the interaction conditions between the grains and the contact surfaces of the workpiece are quite different from those of ordinary grinding. The special mechanism of the ultrasonic vibration grinding significantly improves the grinding efficiency, reduces the grinding temperature and prolongs the service life of the grinding wheel, and the ultrasonic vibration grinding improves the grinding ability to difficult-to-machine materials. Moreover, the ultrasonic vibration causes the grains to produce an intermittent cutting action, the impact load causes the workpiece material to be convolved more easily, and more micro crack propagation in the cutting zone causes the grinding force and the friction coefficient to decrease. The plastic deformation of the material during the grinding process mainly occurs in the stages of sliding friction and plowing. Since the ultrasonic vibration grinding is pulsed intermittent grinding, the proportions of sliding friction and plowing are relatively reduced, then the specific grinding energy is reduced, and the surface thermal damage is also significantly reduced.

Minimum quantity lubrication (MQL) is an environment-friendly grinding technique in which a minimum quantity of lubricating fluid and compressed gas are mixed, atomized and then sprayed to a grinding zone by a nozzle to achieve cooling lubrication. When the minimum quantity of lubricating fluid is sprayed into the grinding zone, the high-pressure gas can achieve cooling and grinding debris removal, and the lubricating fluid takes away the heat generated by the grinding process to reduce the temperature of the grinding zone. The lubricating fluid transported by the high-pressure gas to the workpiece interface of the grinding wheel adheres to the surface of the workpiece and the grains to form a lubricating oil film having a certain anti-friction and anti-wear effect, which can achieve a good lubricating effect and reduce the friction coefficient and the specific grinding energy, thereby reducing the grinding force. The MQL machining technique can be said to combine the advantages of both dry cutting and cast grinding. On the one hand, the quantity of the grinding fluid is minimum, and the flow rate of the grinding fluid per unit grinding wheel width for MQL is 30~100 ml/h. Not only is the quantity of the grinding fluid a few thousandths or even a few ten thousandths of the quantity of the conventional machining method, but also the lubrication effect is improved. Moreover, the lubricating fluid used in the MQL grinding process can be synthetic ester or vegetable oil with good natural degradability, the treatment cost of the lubricating fluid is almost zero, and the pollution to the environment and the harm to human body are extremely low. On the other hand, compared with dry grinding, due to the addition of the lubricating medium, the lubrication state of the grinding zone is significantly improved, the friction between the grinding wheel and the workpiece is reduced, and the machining efficiency is effectively improved.

NMQL is an upgrade and enhancement of the MQL, and its main point is: based on the MQL, an appropriate quantity of nano particles are added to the degradable base oil to prepare nanofluid, and then the nanofluid is mixed and atomized with high-pressure gas and then sprayed to a grinding zone in the form of droplets by a nozzle to achieve cooling lubrication. NMQL grinding is a novel high-efficiency, environment-friendly, clean and low-carbon lubrication method based on the above theory. In the mixture of the nanofluid and the compressed gases sprayed to the grinding zone, the compressed gas achieves the effects of cooling, removing grinding debris and carrying the lubricating fluid; and the nanofluid plays a role in lubrication, friction reduction and wear resistance. The NMQL not only solves the deficiency of the cooling performance of the lubricating fluid in the grinding zone, but also significantly improves the lubrication performance. Although the NMQL has such a good cooling lubrication effect, compared with the cast lubrication method, the nanofluid hardly achieves all-directional lubrication to the grains in operation. Specifically, the nanofluid hardly enters the gaps between the grains and the workpiece and the gaps between the grains and the grinding debris, but generates a large amount of grinding heat, which causes severe surface burn on the surface of the workpiece, and also increases the adhesion of the grinding debris to the grains and the blockage of the grinding wheel.

In the prior art, an ultrasonic vibration three-dimensional ultrasonic spiral grinding method was disclosed, where the axial ultrasonic vibration of a grinding wheel causes the trajectories of grains on the surface of a workpiece to interfere with each other, thereby achieving a reduction in roughness; and at the same time, the radial ultrasonic vibration of the grinding wheel causes the maximum cutting depth of the grains to increase, and the grains implement intermittent cutting, thereby achieving a reduction in the grinding force and an increase in the material removal rate. This method can improve the quality of the machined surface, reduce the surface damage and improve the production efficiency, and is therefore suitable for efficient and precise machining of difficult-to-machine materials. However, this method can only achieve purely radial ultrasonic vibration, but cannot achieve maximum separation between the grinding wheel and the workpiece with the increase of grinding depth, the grinding fluid cannot furthest lubricate the grinding wheel and the workpiece, the cooling lubrication effect of the nanofluid cannot be fully exerted, and the surface burn of the workpiece is not solved.

The prior art discloses a grinding process for machining a solid carbide tool by ultrasonic vibration assisted grinding. The grinding process avoids local instantaneous high temperature by using the advantages of grinding debris removal and heat dissipation of ultrasonic vibration, and effectively prevents grinding cracks and grinding burns by optimizing the grinding parameters of the solid carbide tool, so that the machined surface has good quality. However, this grinding process does not couple NMQL with the ultrasonic vibration, does not improve the lubrication effect of the nanofluid by the ultrasonic vibration, so the cooling lubrication effect is poor.

The prior art discloses a NMQL experimental system and method for ultrasonic vibration assisted grinding. The experimental system comprises a magnetic worktable, a workpiece clamp, a dynamometer and an ultrasonic vibration device; the ultrasonic vibration device comprises a tangential ultrasonic vibration device, an axial ultrasonic vibration device, a vibrating base and a radial piezoelectric ceramic plate fixed on the vibrating base; the tangential ultrasonic vibration device and the axial ultrasonic vibration device are respectively fixed on the vibrating base and simultaneously fixed on the magnetic worktable by holders, the dynamometer is fixed on the vibrating base, and the workpiece clamp is fixed on the dynamometer. The experimental system realizes simultaneous on-line detection of grinding force and grinding temperature, saves time, and avoids machining errors caused by multiple times of assembly. However, the radial ultrasonic vibration of the device is only provided by the piezoelectric ceramic plate, so the radial ultrasonic vibration is not reliable; the manufacturing cost of the ultrasonic vibrator holders in the device is high, and the ultrasonic vibrators are inconvenient to fix on the holders.

Based on the above, the prior art does not apply ultrasonic vibration to the normal direction and tangential direction of the midpoint of the contact arc length between the grinding wheel and the workpiece. The prior art does not study the influence of the grinding debris thickness and the contact arc length between the grinding wheel and the workpiece on the MQL from the microscopic angle under the ultrasonic vibration condition. The thickness of the undeformed grinding debris has a great influence on the grinding process, and it not only affects the force acting on the grains, but also affects the specific grinding energy and the temperature of the grinding zone, thus causing the wear of the grinding wheel and affecting the integrity of the machined surface. Moreover, in the case where the workpiece feed speed is low, the energy conversion is slow, the grinding depth is large. Which results in the long contact arc length between the grinding wheel and the workpiece, the contact area is large, the grains are subjected to a long time, and a part of the energy is slowly transferred to the workpiece, so that the surface of the workpiece is easily burnt.

Therefore, a new research design is required for a NMQL grinding device of ultrasonic vibration assisted grinding fluid micro-channel infiltration.

SUMMARY OF THE INVENTION

In order to overcome the deficiencies of the prior art, the present invention provides an ultrasonic vibration mechanism capable of adjusting the spatial position of ultrasonic vibrators. The mechanism provides ultrasonic vibration that is no longer limited to a two-dimensional arbitrary angle in the horizontal plane and a three-dimensional fixed direction in the space. But from the microscopic angle, the cutting process of grains on a workpiece is taken as a main research object to adjust the spatial position of the ultrasonic vibrator.

A specific scheme of an ultrasonic vibration mechanism capable of adjusting the spatial position of ultrasonic vibrators is as follows:

An ultrasonic vibration mechanism capable of adjusting the spatial position of ultrasonic vibrators comprises:

an arc track base with an arc track at the top;

an adjustable rotor, the bottom of which is arranged on the arc track, wherein the adjustable rotor can rotate along the arc track;

a first ultrasonic vibration component, arranged in the center of the adjustable rotor;

a second ultrasonic vibration component, arranged above the surface of the adjustable rotor through a holder, wherein the second ultrasonic vibration component is parallel to the upper surface of the adjustable rotor, and the second ultrasonic vibration component is arranged perpendicular to the first ultrasonic vibration component;

a workpiece fixing table, the bottom of which is in contact with or connected to the first ultrasonic vibration component and the second ultrasonic vibration component to transmit ultrasonic vibration to a workpiece.

In the mechanism, the adjustable rotor is fixed with the two ultrasonic vibration components, and the rotation of the two ultrasonic vibration components is driven by the rotation of the adjustable rotor, so that the spatial position of the ultrasonic vibration is variable. When being applied to NMQL grinding, the mechanism can adapt to the change in the contact arc length between the grinding wheel and the workpiece caused by different vertical feeds.

Further, a worm shaft is arranged on the arc track base, engaging teeth engaging with the worm shaft are arranged on the lower surface of the adjustable rotor. The worm shaft is a driving shaft, thereby realizing the adjustment of the ultrasonic vibration direction, and simultaneously realizing self-locking. Two ends of the worm shaft are mounted by using deep groove ball bearings to ensure the accuracy and reliability of adjustment of the ultrasonic vibration direction.

Further, an ultrasonic tool head is arranged at the bottom of the workpiece fixing table, the ultrasonic tool head is fastened to the first ultrasonic vibration component and the second ultrasonic vibration component respectively. The top of the ultrasonic tool head forms an arc surface, and T-shaped groove tracks and threads are formed in the arc surface. The T-shaped groove tracks are arranged on two sides of the ultrasonic tool head, the threads are arranged between the two T-shaped groove tracks. The T-shaped groove tracks play a role in guidance and connection, the angle between the ultrasonic tool head and the rotatable workpiece fixing table can be adjusted through the threads, and the top of the ultrasonic tool head is adapted to the bottom surface of the workpiece fixing table. The arc track of the adjustable rotor and the cylindrical surface where the arc surface of the ultrasonic vibration tool head is located are concentric cylindrical surfaces, in order to ensure that the reading on an angle dial of rotatable workpiece fixing table is the same as the reading on an angle dial of the arc track base when the rotatable workpiece fixing table is kept horizontal and its spatial position is unchanged after the adjustable rotor and the ultrasonic vibration tool head rotate certain angles. When two ultrasonic vibration mechanisms are respectively in the horizontal direction and the vertical direction, the angle of the vibration direction is marked as 0°.

Further, the first ultrasonic vibration component comprises a first transducer and a first horn. A groove is formed in the center of the adjustable rotor to receive the first transducer, the first horn is arranged at the top of the first transducer. An ultrasonic vibrator gland is arranged on the outer circumference of the first horn, an ultrasonic vibrator fixing seat is arranged on the surface of the ultrasonic vibrator gland, the ultrasonic vibrator fixing seat is fixed to the surface of the adjustable rotor. The first transducer is connected with an ultrasonic generator specifically by a negative copper sheet and a positive copper sheet that are perpendicular to the tangential direction of the contact arc length between the grinding wheel and the workpiece.

Further, the lower surface of the ultrasonic vibrator fixing seat protrudes, a boss clamping with the lower surface of the ultrasonic vibrator fixing seat is formed on the side or the circumference of the ultrasonic vibrator gland, and the boss can be replaced with a convex ring.

Further, the holder comprises an ultrasonic vibrator holder and an ultrasonic vibrator holder card cover, the joint faces of which are cooperatively L-shaped, an ultrasonic vibrator is clamped axially by a screw, and the ultrasonic vibrator holder card cover is fixed from the radial direction. This structure greatly facilitates the installation and fixation of the ultrasonic vibrator, and also greatly reduces the manufacturing costs of the ultrasonic vibrator holder and the ultrasonic vibrator fixing card cover.

Alternatively, the second ultrasonic vibration component comprises a second transducer and a second horn, the second horn is fixedly connected to the second transducer, the second horn is clamped to the holder, and the second transducer is connected to an ultrasonic generator specifically by a negative copper sheet and a positive copper sheet that are parallel to the tangential direction of the contact arc length between the grinding wheel and the workpiece.

Further, the side of the arc track base is provided with rotation angle scales;

alternatively, the arc track is an arc T-shaped track arranged on the surface of the arc track base, the bottom surface of the adjustable rotor is provided with a T-shaped groove matching with the T-shaped track, the T-shaped groove and engaging teeth are arranged on two sides of the lower surface of the adjustable rotor, correspondingly, the worm shaft is also arranged on one side of the arc track base and cooperates with the engaging teeth, and the other side of the surface of the arc track base is the arc track.

In order to overcome the deficiencies of the prior art, the present invention further provides a NMQL grinding device of ultrasonic vibration assisted grinding fluid micro-channel infiltration, comprising:

the ultrasonic vibration mechanism capable of adjusting the spatial position of ultrasonic vibrators, wherein a dynamometer is arranged at the bottom of the mechanism, and the mechanism is arranged on a worktable;

a NMQL grinding mechanism, arranged above the workpiece fixing table;

a grinding force measuring mechanism, comprising the dynamometer and a grinding force controller connected with the dynamometer, wherein the dynamometer is arranged at the bottom of the ultrasonic vibration mechanism.

In the present invention, the ultrasonic vibration is applied to a tangential direction of the midpoint of the contact arc length between the grinding wheel and the workpiece and a direction perpendicular to the tangential direction. When other grinding conditions and ultrasonic vibration conditions are constant, the separation gap and the separation time of the grinding wheel and the workpiece can be greatly improved, and a micro-channel infiltration condition is formed in the grinding zone, that is, when the grinding wheel is separated from the workpiece, the nanofluid can fully enter the grinding zone. From the aspect of a single grain, the ultrasonic vibration causes grains to cut the workpiece intermittently. In this process, when the grains cut a furrow in the workpiece and are separated from the workpiece, a relatively large quantity of nanofluid is filled into the furrow to achieve a sufficient cooling lubrication effect on the surface of the workpiece.

When the cutting stage is operated again, the nanofluid stored in the furrow achieves a sufficient cooling lubrication effect on further cutting. Adequate lubrication of the nanofluid reduces the adhesion of grinding debris to the grains. These adherends adhere to the surface of the grains at the beginning of the grinding process, and some of the adherends fall off the surface of the workpiece under the action of repeatedly changing grinding force, and then adhere to the surface of the workpiece by grinding of the grains under the action of high temperature and high pressure generated by grinding, so with the assistance of ultrasonic vibration, not only is the blockage of the grinding wheel eliminated, but also the finish of the surface of the workpiece is improved.

Further, the device comprises a grinding temperature measuring mechanism comprising a thermocouple arranged on the workpiece fixing table and a grinding temperature controller connected to the thermocouple;

alternatively, a dynamometer spacer is arranged on each of two sides of the dynamometer, the workpiece fixing table is fixedly connected to the worktable through the dynamometer spacers, and the worktable is a magnetic worktable.

Further, the NMQL grinding mechanism comprises a grinding wheel, a grinding wheel cover is arranged at the upper half of the grinding wheel, a magnetic chuck is arranged on each of two sides of the grinding wheel cover, a nanofluid delivery pipe penetrates through the magnetic chucks, and a nozzle facing the workpiece is arranged at the bottom of the nanofluid delivery pipe.

In order to overcome the deficiencies of the prior art, the present invention also provides a maximum cooling and lubrication method for a grinding zone, using the NMQL grinding device of ultrasonic vibration assisted grinding fluid micro-channel infiltration.

Step 1, the grinding wheel is operated to start grinding, nanofluid and compressed air enter the nozzle. Nanofluid and compressed air are mixed and accelerated in the nozzle to form a three-phase flow: the mixed flow of compressed air, solid nanoparticles and base oil droplets is ejected. The distance d between the nozzle and the workpiece is set to 15~25 cm, and the angle $\alpha$ of the nozzle is set to 15°~30°;

Step 2, the ultrasonic vibration mechanism is operated, the transducer converts high-frequency electric oscillation signals generated by the ultrasonic generator into ultrasonic frequency mechanical vibration, and then the amplitude of the ultrasonic vibration is amplified by the horn to drive the workpiece clamp and the workpiece to generate a vibration of a corresponding frequency, wherein the vibration frequency of the ultrasonic vibrator is 18.9~20 KHz, and the maximum amplitude of the front end of the horn of the ultrasonic vibrator is 8~10 μm;

Step 3, the magnetic worktable is fed in the horizontal direction, the grinding stage begins, the grinding wheel grinds the workpiece, the grains start to cut the workpiece from the microscopic angle, and the grinding wheel intermittently grinds the workpiece under the action of ultrasonic vibration in two directions; when the vibration in two directions is away from an extreme position, the separation gap between the grinding wheel and the workpiece is maximum to reach the condition for forming a micro-channel, and a large amount of nanofluid enters the micro-channel to achieve a good infiltration effect on the workpiece and the grinding wheel;

Step 4, when the ultrasonic vibration in two directions is close to the extreme position of vibration of the workpiece, the grains of the grinding wheel cut the workpiece, and the large amount of nanofluid in the micro-channel takes away a lot of grinding heat, which achieves a good cooling lubrication effect on further grinding;

Step 5, when the ultrasonic vibration causes the grinding wheel to move away from the workpiece again, under good cooling lubrication of the nanofluid in the micro-channel for the grinding zone and intermittent grinding of the grinding wheel for the workpiece, the adhesion of grinding debris to the grains is greatly reduced, and therefore, the blockage of the grinding wheel is eliminated. Of course, all these good grinding effects are based on infiltration of the micro-channel formed between the grinding wheel and the workpiece by ultrasonic vibration.

Compared with the prior art, the present invention has the following advantages:

1) The device can be applied to creep feed grinding to effectively reduce the burn of the ground surface. Based on the NMQL, the assistance of ultrasonic vibration and the theoretical basis of the micro-channel infiltration mechanism, the spatial position of ultrasonic vibration is adjusted by adjusting the position of the adjustable rotor, to achieve the purposes of improving the NMQL effect of the grinding zone and fully improving the utilization of nanofluid.

2) The device of the present invention has all the advantages of the MQL technique, and considers the surface characteristics of the workpiece and the utilization of nanofluid, and the ultrasonic vibration exerts the function of the NMQL to a greater extent, so that the grinding burn is effectively solved, and the utilization of nanofluid is improved.

3) Relative to other vibration directions, a larger separation gap and a longer separation time between the grinding wheel and the workpiece can be obtained by means of the vibration perpendicular to the tangential direction of the contact arc length between the grinding wheel and the workpiece, so that a micro-channel (the micro-channel, also known as a micro-channel heat exchanger, is a heat exchanger having a channel equivalent diameter of 10~1000 μm) and a good entry condition are formed more easily between the grinding wheel and the workpiece. The nanofluid fully enters the grinding zone, the lubrication cooling effect and effective utilization of the nanofluid are greatly improved. In addition to all the advantages of ultrasonic vibration assisted NMQL grinding, the device fully considers the lubrication state of single grains during material removal in the grinding process from the microscopic angle, thereby effectively realizing the function of ultrasonic vibration assisted grinding on improving the cooling lubrication effect of NMQL.

4) The device of the present invention effectively eliminates the blockage of the grinding wheel, improves the utilization of the nanofluid, solves the grinding burn, improves the surface quality of the workpiece, and realizes low-carbon green clean production with high efficiency, low consumption, environment friendliness and resource saving.

BRIEF DESCRIPTION OF THE DRAWINGS

The accompanying drawings constituting a part of the present application are used for providing a further understanding on the present application, and the schematic embodiments of the present application and the description thereof are used for interpreting the present application, rather than constituting improper limitation to the present application.

FIG. 11($b$) is a cross-sectional view taken along line A-A of FIG. 11($a$);

FIG. 12($b$) is a three-dimensional view indicating that a single grain cuts the workpiece;

FIG. 15($b$) shows a relative motion trajectory that the grains of the ultrasonic vibration grinding wheel grind the workpiece parallel to and perpendicular to the tangential direction of the midpoint of the contact arc length between the grinding wheel and the workpiece;

FIG. 15($c$) shows a relative motion trajectory that the grains of the ultrasonic vibration grinding wheel grind the workpiece perpendicular to the tangential direction of the midpoint of the contact arc length between the grinding wheel and the workpiece;

FIG. 15($d$) shows a relative motion trajectory that the grains of the ultrasonic vibration grinding wheel grind the workpiece parallel to the tangential direction of the midpoint of the contact arc length between the grinding wheel and the workpiece;

Figure 1:
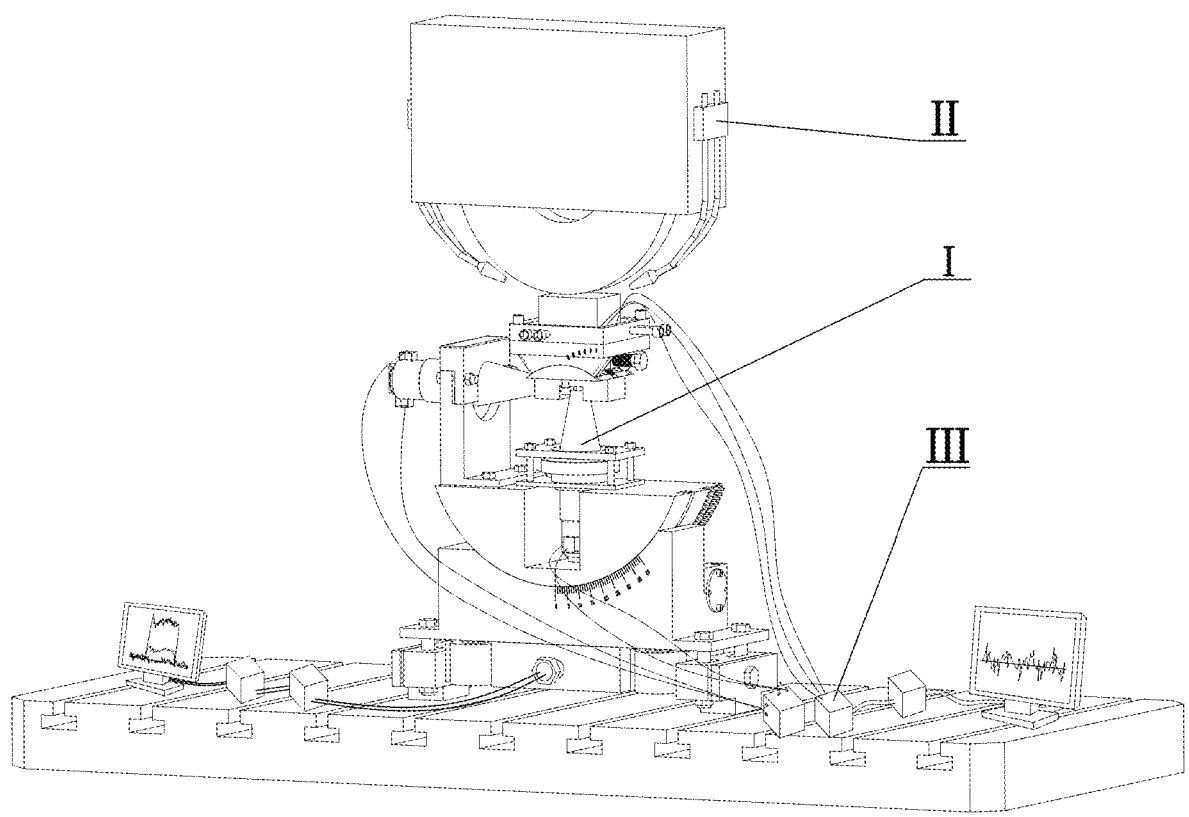
FIG. 1 is an axonometric view of a NMQL grinding experimental device based on an ultrasonic vibration assisted grinding fluid micro-channel infiltration mechanism.

In which, I-1—dynamometer, I-2—dynamometer connecting nut, I-3—dynamometer output connecting nut, I-4—arc track base, I-5—adjustable rotor, I-6—negative copper sheet perpendicular to the tangential direction of the contact arc length between the grinding wheel and the workpiece, I-7—transducer perpendicular to the tangential direction of the contact arc length between the grinding wheel and the workpiece, I-8—ultrasonic vibrator holder fixing screw, I-9—amplitude-change pole perpendicular to the tangential direction of the contact arc length between the grinding wheel and the workpiece, I-10—ultrasonic vibrator holder, I-11—ultrasonic vibrator holder card cover, I-12—negative copper sheet parallel to the tangential direction of the contact arc length between the grinding wheel and the workpiece, I-13—ultrasonic vibrator holder card cover bolt, I-14—ultrasonic vibrator holder card cover nut, I-15—transducer parallel to the tangential direction of the contact arc length between the grinding wheel and the workpiece, I-16—positive copper sheet parallel to the tangential direction of the contact arc length between the grinding wheel and the workpiece, I-17—axial workpiece positioning screw, I-18—workpiece clamp fixing screw, I-19—workpiece, I-20—workpiece clamp, I-21—tangential workpiece positioning screw, I-22—rotatable workpiece fixing table, I-23—rotatable workpiece fixing table adjusting screw, I-24—ultrasonic tool head, I-25—horn parallel to the tangential direction of the contact arc length between the grinding wheel and the workpiece, I-26—bearing upper cover, I-27—bearing end cover screw, I-28—bearing end cover, I-29—dynamometer connecting bolt, I-30—dynamometer spacer, I-31—dynamometer spacer fixing screw, I-32—bearing upper cover fixing screw, I-33—adjusting handle, I-34—worm shaft connecting rod, I-35—deep groove ball bearing, I-36—worm shaft, I-37—sleeve cup, I-38—horn connecting stud perpendicular to the tangential direction of the contact arc length between the grinding wheel and the workpiece, I-39—horn connecting stud parallel to the tangential direction of the contact arc length between the grinding wheel and the workpiece, I-40—positive copper sheet perpendicular to the tangential direction of the contact arc length between the grinding wheel and the workpiece, I-41—bearing end cover screw, I-42—bearing end cover, I-43—reduction worm gear, I-44—bearing block, I-45—flat key, I-46—worm shaft, I-47—workpiece positioning stop, I-48—set screw, I-49—ultrasonic vibrator gland fixing screw, I-50—ultrasonic vibrator gland, I-51—ultrasonic vibrator fixing seat, I-52—T-shaped groove, I-53—engaging teeth, I-54—T-shaped groove tracks, II-1—grinding wheel cover, II-2—magnetic chuck, II-3—grinding wheel, II-4—nanofluid delivery pipe, II-5—compressed air delivery pipe, II-6—nozzle, II-7—magnetic worktable, III-1—grinding force controller, III-2—grinding force information collector, III-3—amplifier, III-4—thermocouple, III-5—grinding temperature information collector, III-6—grinding temperature controller, III-7—low pass filter, III-8—ultrasonic generator, III-9—negative lead, III-10—positive lead.

DETAILED DESCRIPTION OF THE EMBODIMENTS

It should be pointed out that the following detailed descriptions are all exemplary and aim to further illustrate the present application. Unless otherwise specified, all technical and scientific terms used in the descriptions have the same meanings generally understood by those of ordinary skill in the art of the present application.

It should be noted that the terms used herein are merely for describing specific embodiments, but are not intended to limit exemplary embodiments according to the present application. As used herein, unless otherwise explicitly pointed out by the context, the singular form is also intended to include the plural form. In addition, it should also be understood that when the terms "include" and/or "comprise" are used in the specification, they indicate features, steps, operations, devices, components and/or their combination.

As described in the background, the prior part has deficiencies. In order to solve the above technical problems, the present application proposes a NMQL grinding device of ultrasonic vibration assisted grinding fluid micro-channel infiltration.

In a typical embodiment of the present application, the first embodiment of the present invention is as shown in FIGS. 1 to 5, 7 to 11, 15 (a), 15 (e) and 18, the experimental device is mainly applied to reciprocating high speed or ultra-high speed grinding, the adjustment angle is 0° at this time, and the first embodiment relates to an axially coupled ultrasonic vibration assisted NMQL grinding mechanism with respect to the tangential direction parallel to the grinding direction and perpendicular to the grinding direction and a grinding force and grinding temperature measuring mechanism thereof.

As shown in FIG. 1, a NMQL grinding experimental device based on an ultrasonic vibration assisted grinding fluid micro-channel infiltration mechanism consists of three parts, i.e., an ultrasonic vibration mechanism I, a NMQL grinding mechanism II, and a grinding force and grinding temperature measuring mechanism III.

Figure 2:
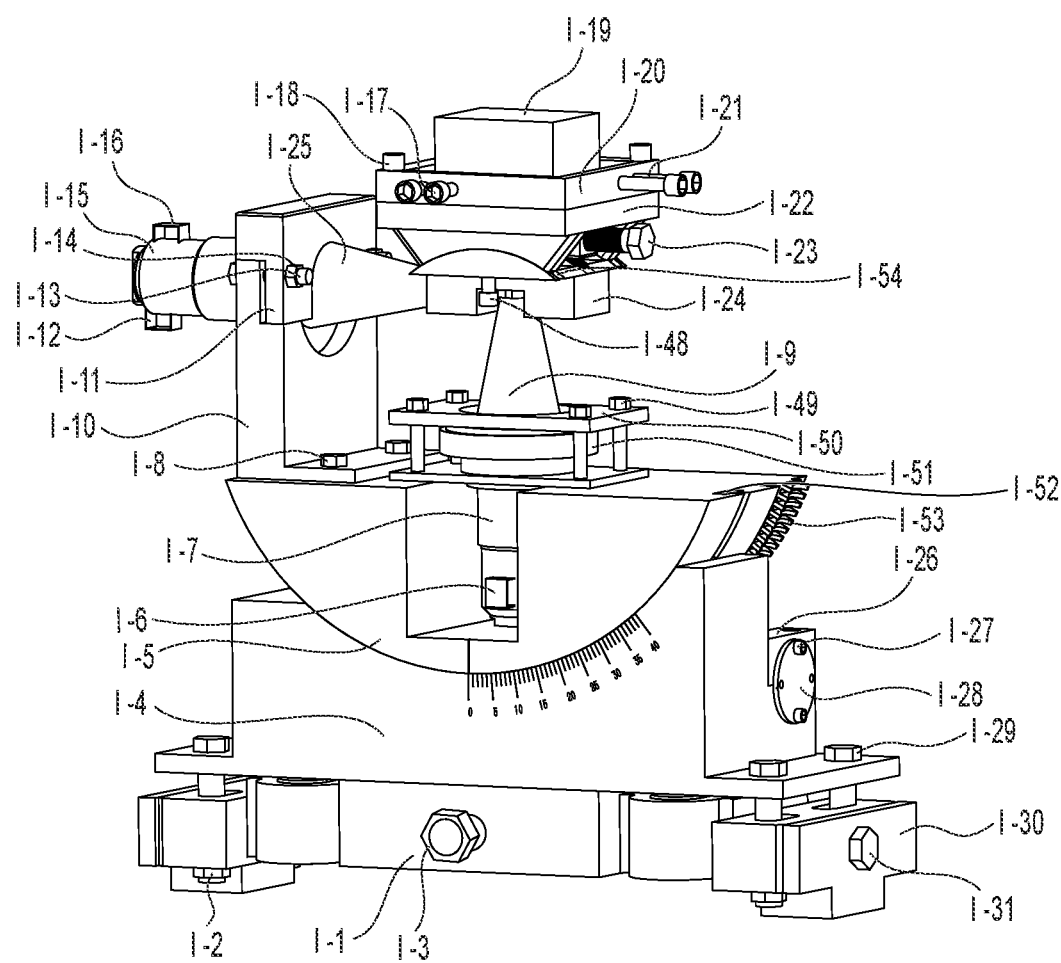
FIG. 2 is an axonometric view of an ultrasonic vibration device in part I of a first embodiment.
Figure 3:
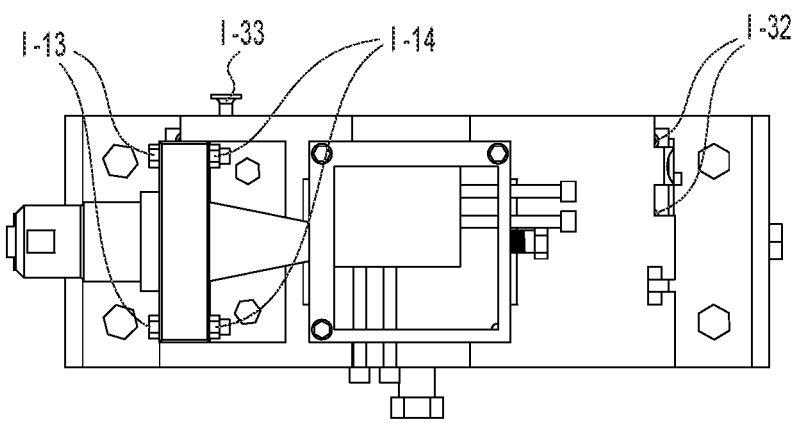
FIG. 3 is a top view of the ultrasonic vibration device in part I of the first embodiment.
Figure 4:
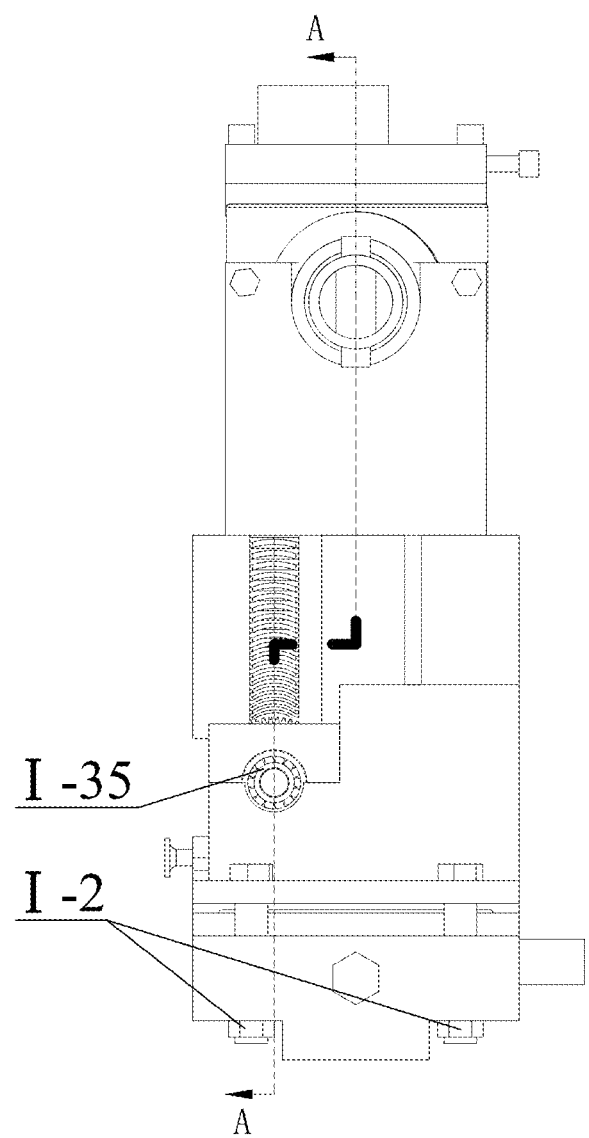
FIG. 4 is a left view of the ultrasonic vibration device in part I of the first embodiment.

As shown in FIG. 2, an arc track base I-4 is fixed to the upper surface of a dynamometer I-1 by four dynamometer connecting bolts I-29, and an adjustable rotor I-5 is connected to the arc track base I-4 by a T-shaped connection fixing guide rail; a transducer I-7 perpendicular to a tangential direction of a contact arc length between a grinding wheel and a workpiece is axially and radially fixed by a circular groove in the upper surface of the adjustable rotor I-5, and a horn I-9 perpendicular to the tangential direction of the contact arc length between the grinding wheel and the workpiece is directly connected and fixed to an ultrasonic tool head I-24 by a stud; an ultrasonic vibrator holder I-10 is connected and fixed to the adjustable rotor I-5 by two ultrasonic vibrator holder screws I-8; an ultrasonic vibrator is fixed by the ultrasonic vibrator holder I-10 and an ultrasonic vibrator holder card cover I-11, axially fixed by an ultrasonic vibrator holder card cover bolt I-13 and an ultrasonic vibrator holder card cover nut I-14, and radially fixed and clamped by the ultrasonic vibrator holder card cover I-11; a horn I-25 parallel to the tangential direction of the contact arc length between the grinding wheel and the workpiece is directly connected and fixed to the ultrasonic tool head I-24 by a stud; the ultrasonic tool head I-24 is fixed to a rotatable workpiece fixing table 22 by a rotatable workpiece fixing table adjusting screw I-23 and set screws I-48; and a workpiece clamp I-20 is fixed to the rotatable workpiece fixing table I-22 by three clamp screws I-18 arranged in an L shape. FIG. 2 also shows a T-shaped groove I-52, engaging teeth I-53 and T-shaped groove tracks I-54. The arc T-shaped track is provided within the T-shaped groove.

Figure 5:
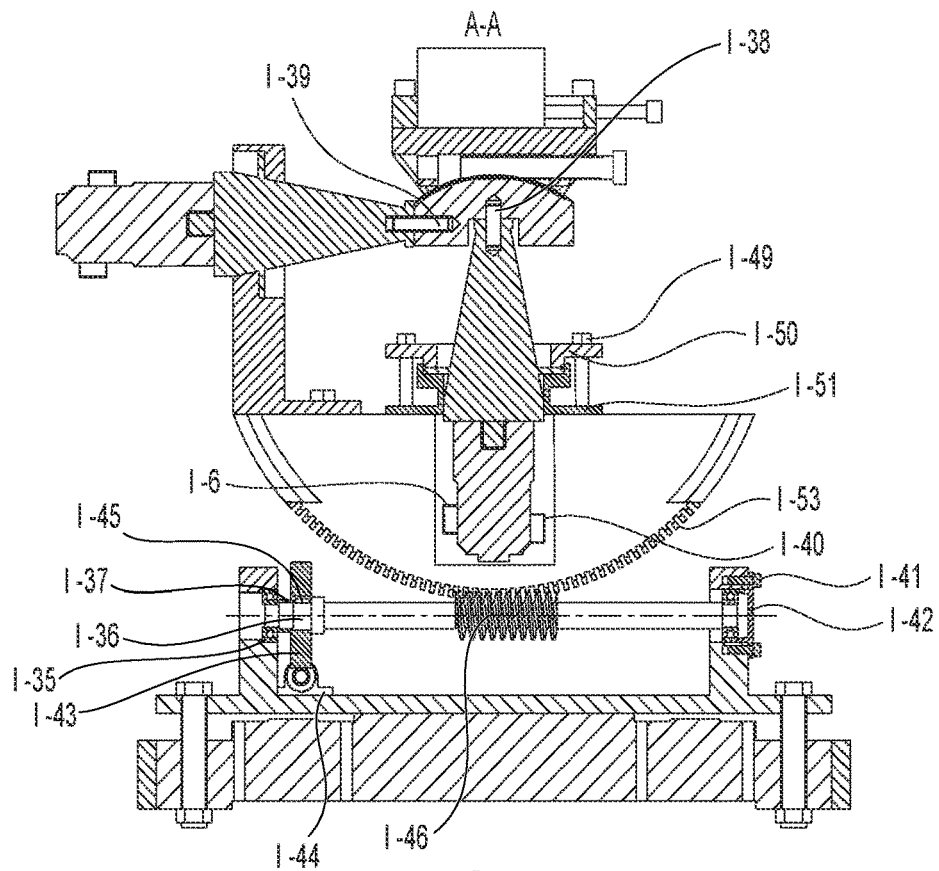
FIG. 5 is a cross-sectional view of FIG. 4.
Figure 6:
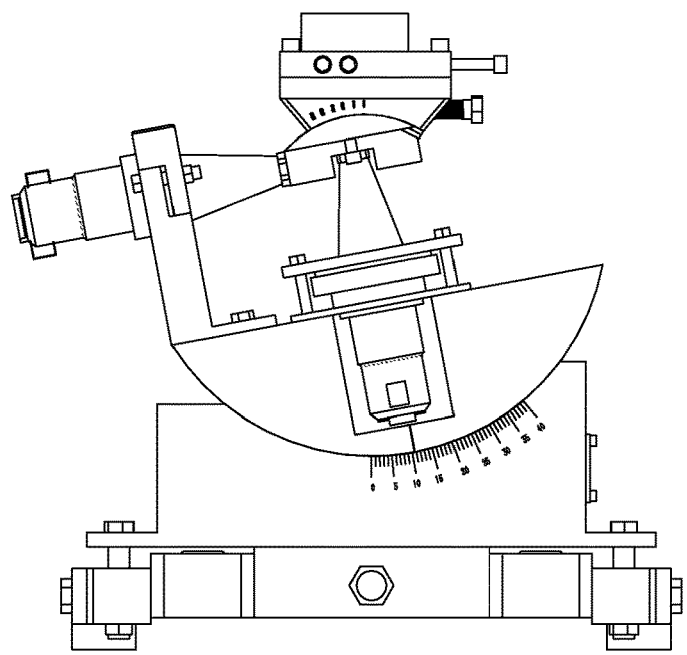
FIG. 6 is a front view of the ultrasonic vibration device in part I of a second embodiment.

As shown in FIG. 5, the worm shaft I-46 is supported and fixed on the arc track base by two deep groove ball bearings, one end of the worm shaft has a key groove for mounting and fixing a reduction worm gear I-43; the two deep groove ball bearings for fixing and supporting the worm shaft I-46 are axially fixed at two ends, the outer ring of the deep groove ball bearing at one end where the reduction worm gear is mounted is fixed by a bearing portion on the arc track base, and the inner ring is fixed by a shoulder of the worm shaft; the outer ring of the other deep groove ball bearing is fixed by a bearing end cover, and the inner ring is fixed by the other shoulder of the worm shaft I-46. The two deep groove ball bearings for fixing and supporting the reduction worm gear I-43 are also fixedly mounted at two ends, one bearing is mounted in the circular groove of the arc track base, the other bearing is mounted in a bearing block, and the bearing block is directly fixed on the arc track base by screws.

Figure 7:
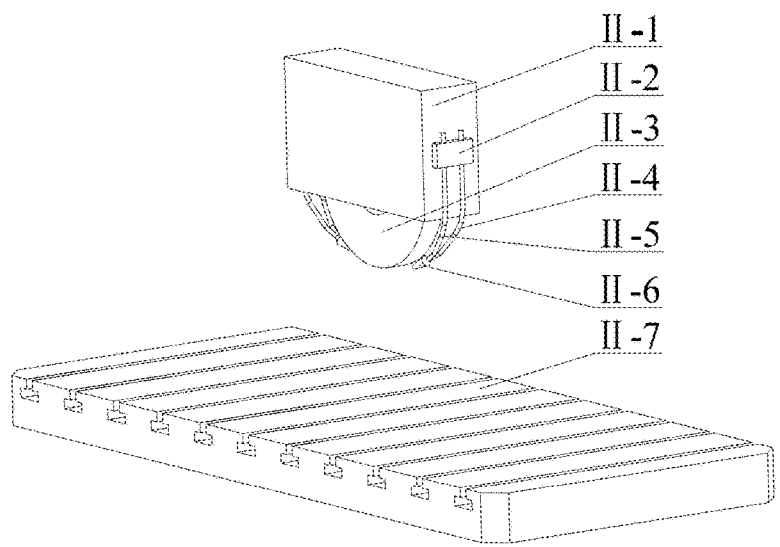
FIG. 7 is an axonometric view of the NMQL grinding device in part II.

As shown in FIG. 7, the NMQL grinding mechanism includes a grinding wheel cover II-1, magnetic chucks II-2, a grinding wheel II-3, a nanofluid delivery pipe II-4, a compressed air delivery pipe II-5, a nozzle II-6, and a magnetic worktable II-7, wherein a magnetic chuck II-2 is arranged on each of two sides of the grinding wheel cover II-1 to fix the nanofluid delivery pipe II-4 and the compressed air delivery pipe II-5; the nanofluid delivery pipe II-4 and the compressed air delivery pipe II-5 are converged at the nozzle II-6, so that nanofluid and compressed air are thoroughly mixed in the inner cavity of the nozzle II-6 to form aerosol and the aerosol is sprayed to the interface of the grinding wheel II-3 and the workpiece I-12 to achieve lubrication and cooling for grinding.

Figure 8:
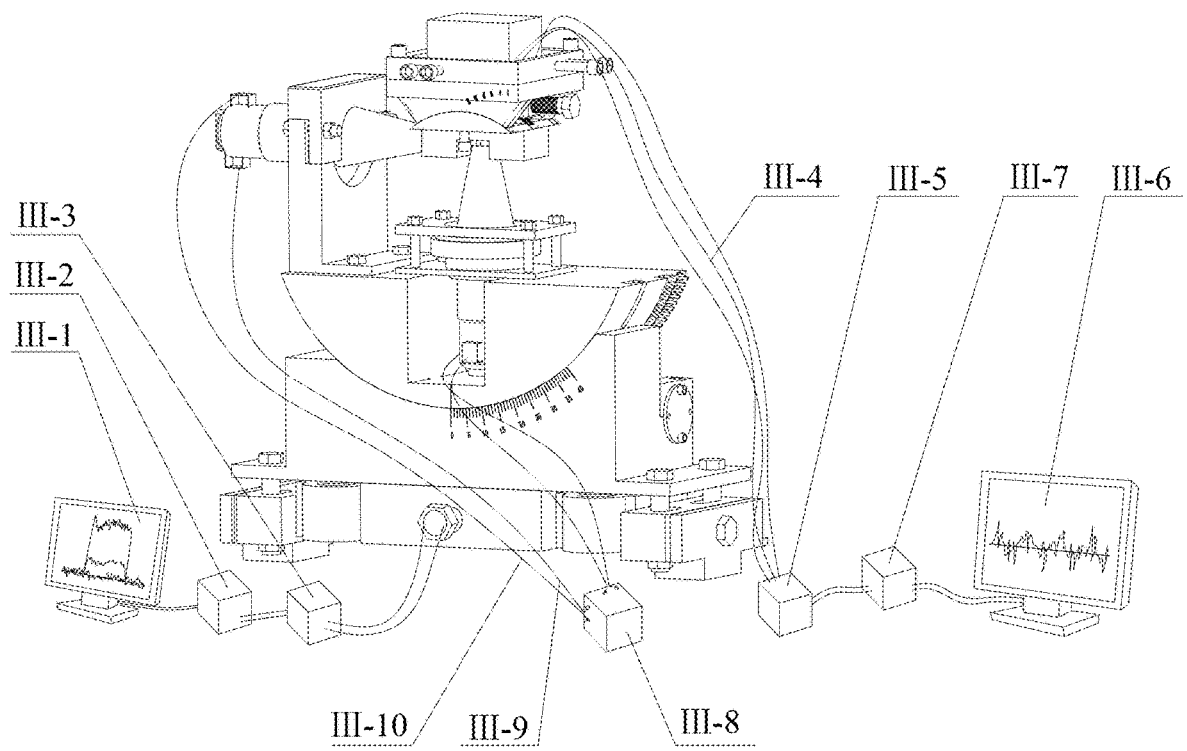
FIG. 8 is an axonometric view of an on-line measuring device for grinding force and grinding temperature in part III.

As shown in FIG. 8, the dynamometer I-1 is connected to a dynamometer spacer I-30 by a dynamometer spacer fixing screw I-31, and the dynamometer spacer I-30 is fixed to the magnetic worktable II-7 by means of magnetic attraction. The grinding force measuring mechanism includes a grinding force controller III-1, a grinding force information collector III-2, an amplifier III-3 and a dynamometer I-9. When the workpiece I-19 is subjected to a grinding force, measurement signals are amplified by the amplifier III-3, then transmitted to the grinding force information collector III-2, and finally transmitted to the grinding force controller III-1 (the controller is a programmable controller with a display) for displaying the magnitude of the grinding force. The grinding temperature measuring mechanism includes a thermocouple III-4, a grinding temperature information collector III-5, a low pass filter III-7, and a grinding temperature controller III-6. Measurement signals are transmitted to the grinding temperature information collector III-5 by the thermocouple III-4, then to the low pass filter III-7 to filter interference signals, and finally to the grinding temperature controller III-6 (the controller is a programmable controller with a display) for displaying the working temperature of the thermocouple III-4, i.e., the temperature of the workpiece I-19. An ultrasonic generator III-8 simultaneously provides ultrasonic frequency electrical signals for the transducer I-7 perpendicular to the tangential direction of the contact arc length between the grinding wheel and the workpiece and a transducer I-15 parallel to the tangential direction of the contact arc length between the grinding wheel and the workpiece, and the ultrasonic frequency electrical signals are transmitted to positive and negative copper sheets on the transducers by a positive lead III-10 and a negative lead III-9.

Figure 9:
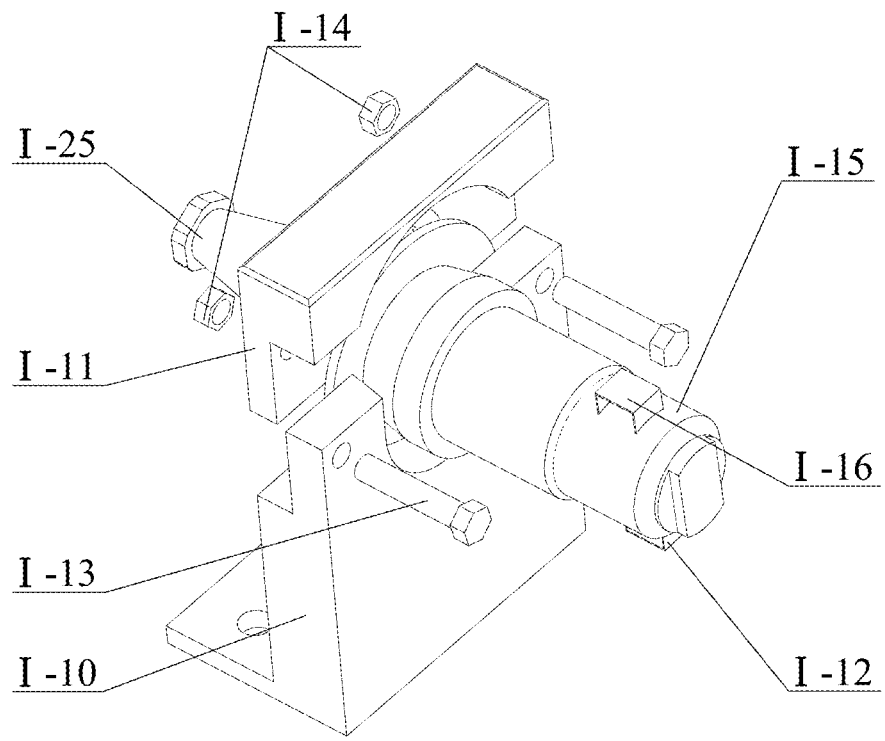
FIG. 9 is a schematic installation view of an ultrasonic vibrator and an ultrasonic vibrator holder perpendicular to the tangential direction of the midpoint of a contact arc length between a grinding wheel and a workpiece.

As shown in FIG. 9, a horn I-15 parallel to the tangential direction of the contact arc length between the grinding wheel and the workpiece and the ultrasonic vibrator holder I-10 are mounted in such a manner that the ultrasonic vibrator holder I-10 is provided with a conical surface in the same shape as the horn I-15 parallel to the tangential direction of the contact arc length between the grinding wheel and the workpiece, to position the horn I-15 parallel to the tangential direction of the contact arc length between the grinding wheel and the workpiece; the ultrasonic vibrator holder I-10 and the ultrasonic vibrator holder card cover I-11 are provided with circular grooves having the same radius as the positioning shaft shoulders of the horn I-15 parallel to the tangential direction of the contact arc length between the grinding wheel and the workpiece, to fix and clamp the horn I-15 parallel to the tangential direction of the contact arc length between the grinding wheel and the workpiece; the ultrasonic vibrator holder I-10 and the ultrasonic vibrator holder card cover I-11 are provided with bolt holes, and the horn I-15 parallel to the tangential direction of the contact arc length between the grinding wheel and the workpiece is fixed between the ultrasonic vibrator holder I-10 and the ultrasonic vibrator holder card cover I-11 by the ultrasonic vibrator holder card cover bolt I-13 and the ultrasonic vibrator holder card cover nut I-14; this mounting method greatly reduces the manufacturing difficulty and machining cost of the ultrasonic vibrator holder I-10 and the ultrasonic vibrator holder card cover I-11, and facilitates the fixation of the horn parallel to the tangential direction of the contact arc length between the grinding wheel and the workpiece.

Figure 10:
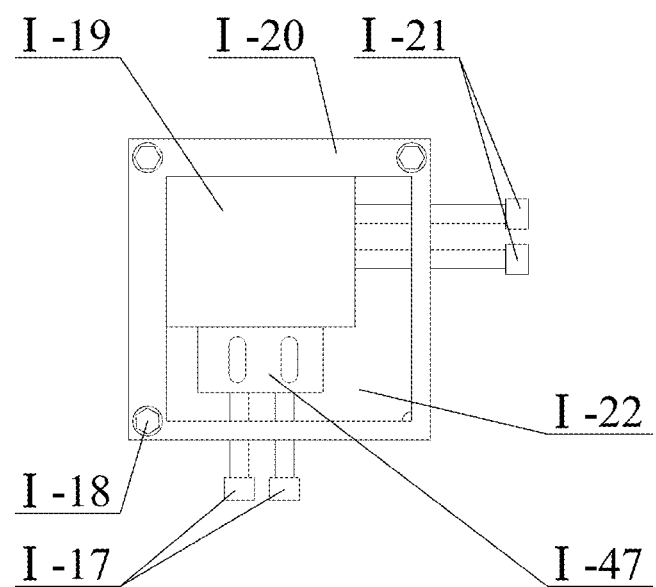
FIG. 10 is a schematic structural view of a workpiece positioning and clamping device.

As shown in FIG. 10, the workpiece clamp I-20 on the rotatable workpiece fixing table I-22 is positioned and clamped by three workpiece clamp fixing screws I-18 arranged in an L shape; the workpiece I-19 is axially positioned and clamped by a workpiece positioning stop I-47 and two axial workpiece positioning screws I-17, and tangentially positioned and clamped by two tangential workpiece positioning screws I-21; the workpiece positioning stop I-47 is used because of different size of the workpiece I-19, it is difficult to keep the workpiece I-19 stable only by the two axial workpiece positioning screws I-17, so the workpiece I-19 of different size can be stably mounted by the workpiece positioning stop I-47.

Figure 11A:
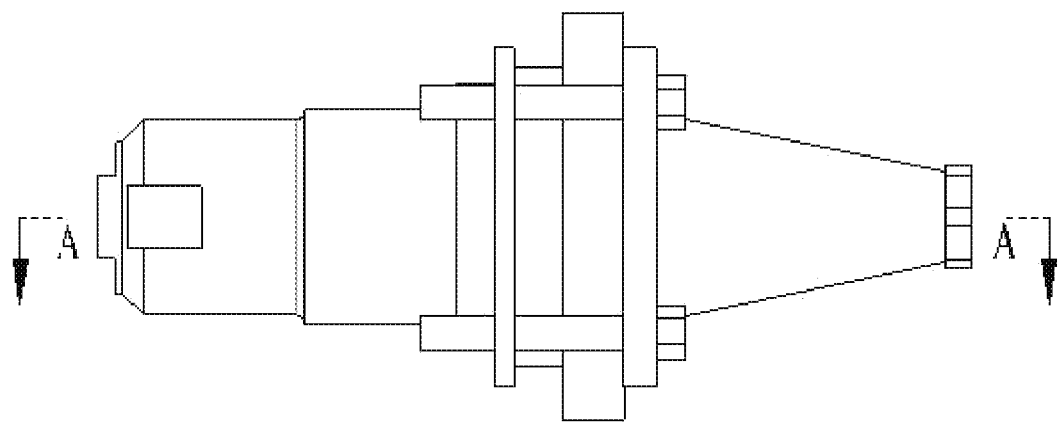
FIG. 11($a$) is an installation view of the ultrasonic vibrator perpendicular to the tangential direction of the midpoint of the contact arc length between the grinding wheel and the workpiece.
Figure 11B:
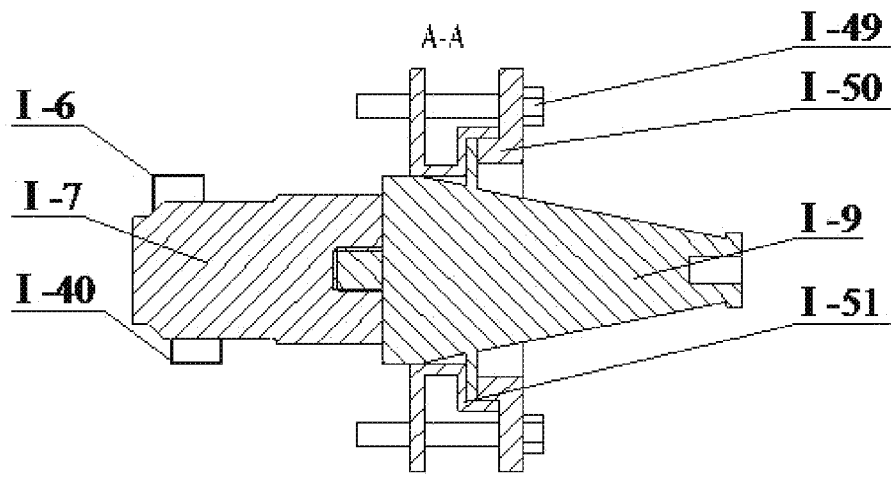
Figure 12A:
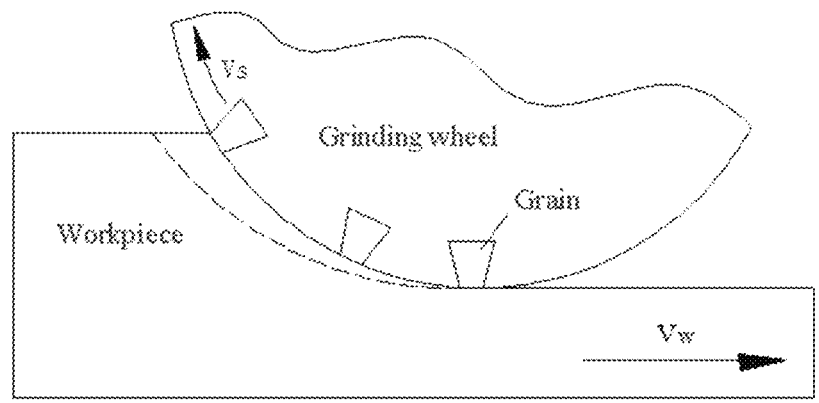
FIG. 12($a$) is a side view indicating that single grains cut the workpiece.
Figure 12B:
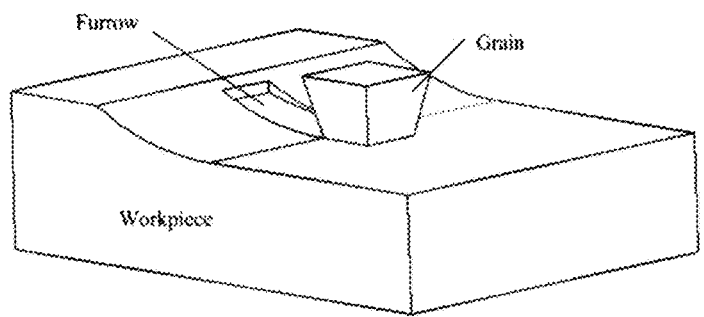

As shown in FIG. 11(a) and FIG. 11(b), the horn I-9 of the ultrasonic vibrator perpendicular to the tangential direction of the midpoint of the contact arc length between the grinding wheel and the workpiece is fixed by an ultrasonic vibrator fixing seat I-51 and an ultrasonic vibrator gland I-50 that are connected and fixed by ultrasonic vibrator gland fixing screws I-49, and the horn I-9 is in tight fit with the ultrasonic vibrator fixing seat I-51 to ensure the radial fixing reliability of the ultrasonic vibrator.

Figure 13:
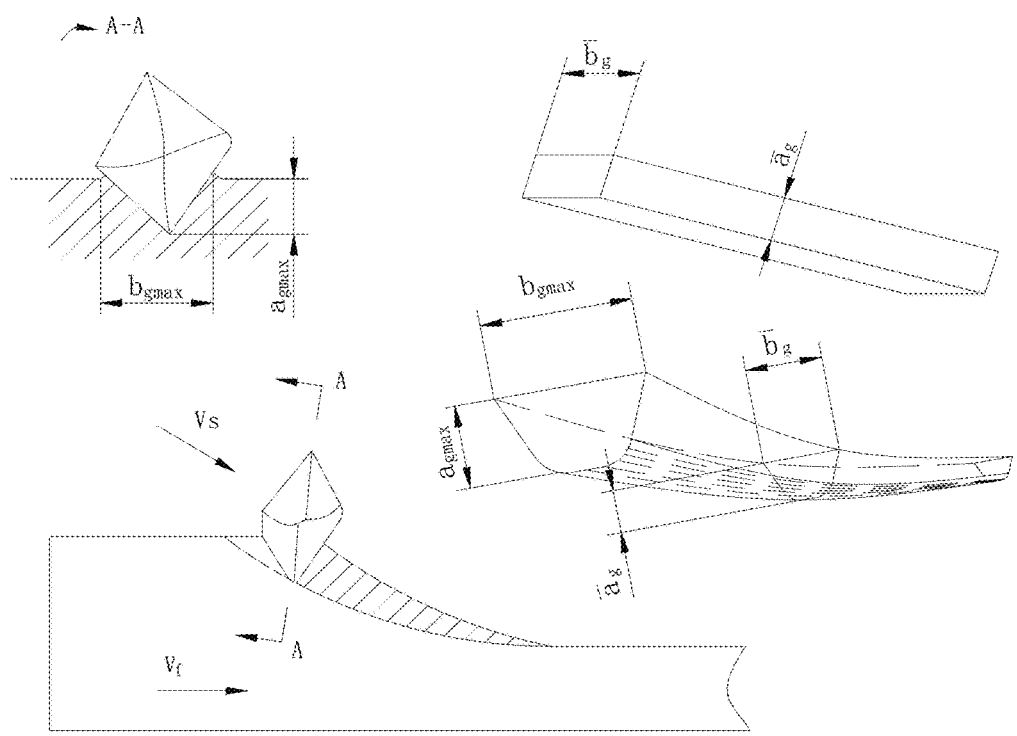
FIG. 13 is a schematic view of volume conversion of grinding debris during grinding.
Figure 14:
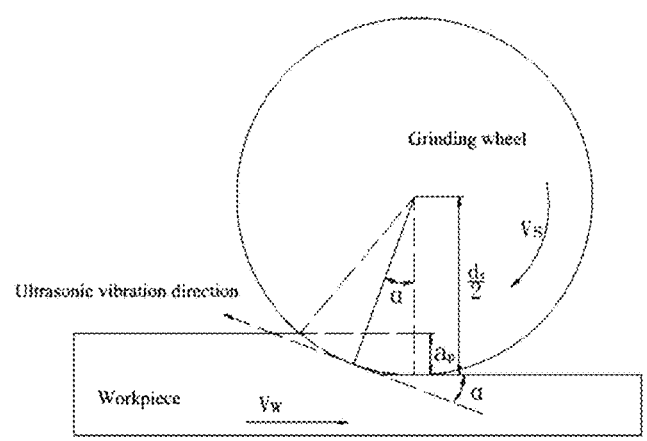
FIG. 14 is a schematic view of angle calculation of the ultrasonic vibration direction.

According to a second embodiment of the present invention, the experimental device is applied to creep feed grinding. The ultrasonic vibration mechanism I, the NMQL grinding mechanism II and the grinding force and grinding temperature measuring mechanism III in the second embodiment are the same as those in the first embodiment. The experimental device can be implemented by only controlling the ultrasonic generator. The ultrasonic generator III-8 is controlled to output only ultrasonic signals perpendicular to the tangential direction of the midpoint of the contact arc length between the grinding wheel and the workpiece, thus generating an ultrasonic vibration perpendicular to the tangential direction of the midpoint of the contact arc length between the grinding wheel and the workpiece. The ultrasonic vibrator parallel to the tangential direction of the midpoint of the contact arc length between the grinding wheel and the workpiece does not work. According to different vertical feeds, the angles perpendicular to the midpoint of the contact arc length between the grinding wheel and the workpiece are also different. By rotating an adjusting handle I-33, the adjustable rotor rotates an angle, which is a between the connecting line of the midpoint of the contact arc length between the grinding wheel and the workpiece and the center of the grinding wheel, and a perpendicular to the horizontal plane. As shown in FIG. 13, a is calculated as follows.

From $$\cos(2\alpha) = \frac{d_s/2 - a_p}{d_s/2}, \qquad (1)$$

it is obtained:

$$\alpha = \frac{1}{2}\arccos\left(\frac{d_s - 2a_p}{d_s}\right) \qquad (2)$$

In which, $d_s$ is the diameter of the grinding wheel, taking $d_s$=300 mm;

$a_p$ is the vertical feed, taking $a_p$=10 mm;
substituting them to (2) to obtain $\alpha$=10.5°.

Figure 16:
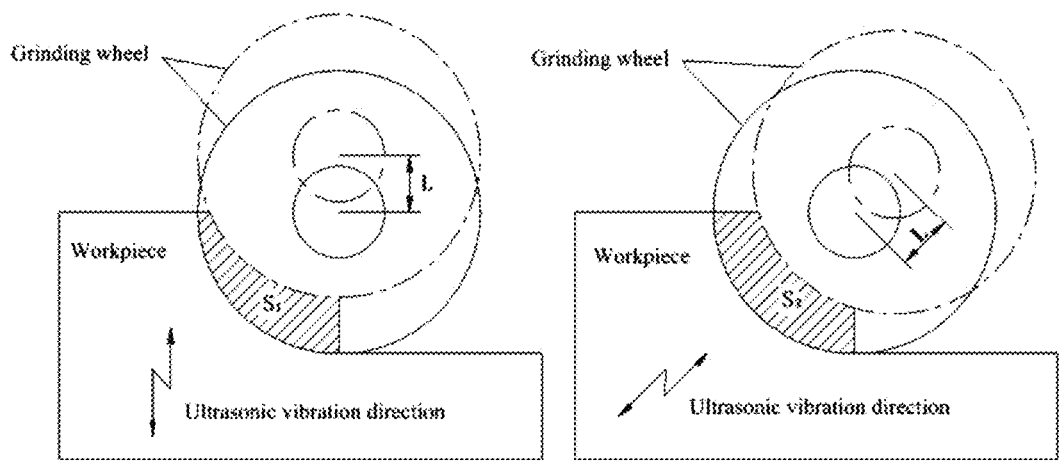
FIG. 16 is a schematic view of comparison of separation gaps between the grinding wheel and the workpiece in different ultrasonic vibration directions.

Using the limit thinking, the vertical feed is the same as the radius of the grinding wheel, the separation gap between the grinding wheel and the workpiece caused by the radial ultrasonic vibration is much smaller than that caused by the ultrasonic vibration perpendicular to the tangential direction of the middle point of the contact arc length between the grinding wheel and the workpiece, specifically, as shown in FIG. 16, $S_1$=4469.82 mm², $S_2$=5892.68 mm², and the separation gap is increased by 31.83% by calculation, so the condition for forming a micro-channel between the grinding wheel and the workpiece is greatly satisfied, the infiltration effect of the nanofluid on the grinding zone is improved, and the cooling and lubrication effect on the grinding zone is also improved. When the ultrasonic vibration is applied in this direction, the separation gap and the separation time between the grinding wheel and the workpiece can be maximum, thereby forming a micro-channel between the grinding wheel and the workpiece, greatly improving the infiltration effect of the nanofluid on the grinding zone, and also improving the cooling and lubrication effect on the grinding zone.

According to a third embodiment of the present invention, the experimental device is applied to creep feed grinding. The ultrasonic vibration mechanism I, the NMQL grinding mechanism II and the grinding force and grinding temperature measuring mechanism III in the third embodiment are the same as those in the second embodiment. The experimental device can be implemented by only controlling the ultrasonic generator. The ultrasonic generator III-8 is controlled to output ultrasonic signals in two directions to generate ultrasonic vibrations perpendicular to and parallel to the tangential direction of the midpoint of the contact arc length between the grinding wheel and the workpiece, thus generating a relative motion trajectory of grains of the grinding wheel II-3 and the workpiece I-19 as shown in FIG. 15(*b*). The two-dimensional ultrasonic vibration of this embodiment can change the maximum undeformed cutting thickness and average thickness of grinding debris, improve the material removal rate, provide a good condition for micro-channel infiltration, and cause the nanofluid to infiltrate the grinding wheel and the workpiece more thoroughly, thereby greatly improving the cooling lubrication effect and the utilization of the nanofluid. The schematic view of volume conversion of the grinding debris during grinding is as shown in FIG. 13, and the relevant calculation is as follows:

Derived from the principle of constant volume, the maximum thickness of plane grinding undeformed grinding debris is:

$$a_{g\,max} = \left[\frac{4v_w}{v_s N_s C}\sqrt{\frac{a_p}{d_s}}\right] \qquad (3)$$

$N_s$: the number of effective grinding edges per unit area of the grinding wheel;

C: the ratio of width to thickness of the grinding debris, i.e., C=$b_g$/$a_g$.

The fish-like grinding debris is replaced with a similar rectangular hexahedron, $$V_0 = \frac{V_W}{N_S} \qquad (4)$$

In which, $V_0$: the volume of each grain;

$V_w$: the volume of the ground workpiece material.

Formula (4) can be written as $$\overline{b_g}\overline{a_g}\overline{l_s} = \frac{v_w b a_p}{v_s b N_s} \qquad (5)$$

In which, $\overline{b_g}$: the average width of the grinding debris, $\overline{b_g}$=C$\overline{a_g}$ (C is a proportional coefficient, related to the tip angle of the grain);

$\overline{a_g}$: the average thickness of the grinding debris, $\overline{a_g}$=½ $a_{g\,max}$;

$l_s$: the length of the undeformed grinding debris, the value of which can be solved by a geometric contact length formula, i.e., $$l_s = (a_p d_s)^{\frac{1}{2}}$$

So it can be derived from formula (4)

$$\overline{a_g} = \left[\frac{v_w}{v_s}a_p\right][N_s l_s \overline{b}]^{-1} = \left[\frac{1}{N_s l_s C}\frac{v_w}{v_s}a_p\right]^{\frac{1}{2}} \qquad (6)$$

$$\text{Or } a_{g\,max} = \left[\frac{4v_w}{l_s N_s C v_s}\frac{a_p}{v_s}\right]^{\frac{1}{2}} = \left[\frac{4v_w}{v_s N_s C}\sqrt{\frac{a_p}{d_{se}}}\right]^{\frac{1}{2}} \quad (7)$$

According to a fourth embodiment of the present invention, the experimental device is applied to creep feed grinding. The ultrasonic vibration mechanism I, the NMQL grinding mechanism II and the grinding force and grinding temperature measuring mechanism III in the fourth embodiment are the same as those in the second embodiment. The experimental device can be implemented by only controlling the ultrasonic generator. The ultrasonic generator III-8 is controlled to output only ultrasonic signals parallel to the tangential direction of the midpoint of the contact arc length between the grinding wheel and the workpiece to generate an ultrasonic vibration parallel to the tangential direction of the midpoint of the contact arc length between the grinding wheel and the workpiece, while the ultrasonic vibrator perpendicular to the tangential direction of the midpoint of the contact arc length between the grinding wheel and the workpiece does not work, thus generating a relative motion trajectory of grains of the grinding wheel II-3 and the workpiece I-19 as shown in FIG. 15(d). The ultrasonic vibration in this direction can increase the grinding arc length by increasing the action area of the grinding wheel and the workpiece, to increase the number of grains involved in cutting per unit time, thereby improving the material removal rate, and improving the grinding ability of the grains without increasing a macro grinding force.

As shown in FIG. 16, a 220V alternating current power supply supplies power to the oscillation stage, power stage and phase detection portion of the ultrasonic generator III-8; the ultrasonic frequency signals generated by the oscillation stage are amplified by the amplification stage, the power of the ultrasonic signals is improved by the power stage, and then the ultrasonic signals are transmitted to the transducer by impedance matching; the sampling signal feedback compares the output power of the ultrasonic generator III-8 with the power of the transducer; if the power is not equal, the signals are fed back to the oscillation stage and the power stage to generate power equal to that of the transducer; the phase detection and phase adjustment portion can detect and control the phases of ultrasonic vibrations in two directions, thereby realizing different phase differences, and generating different motion trajectories.

Figure 15A:
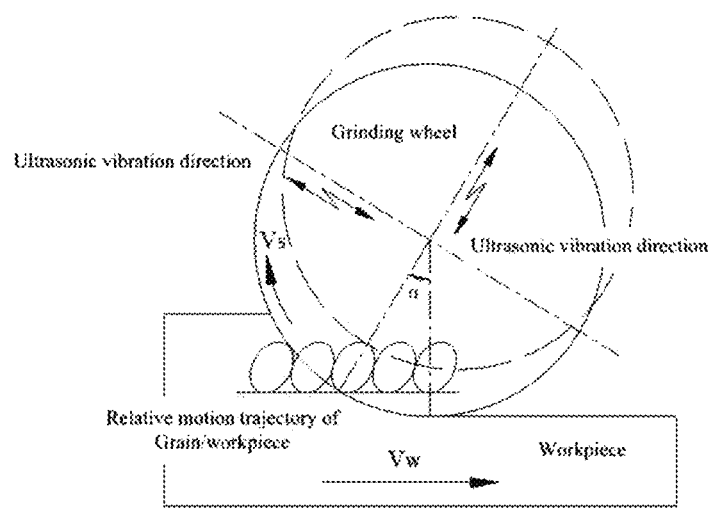
FIG. 15($a$) is a schematic view of relative motion of the grinding wheel and the workpiece in ultrasonic vibration assisted grinding parallel to and perpendicular to the tangential direction of the midpoint of the contact arc length between the grinding wheel and the workpiece.
FIG. 15(e) shows a relative motion trajectory that the grains of the ultrasonic vibration grinding wheel grind the workpiece in a tangential and axial combined direction.
FIG. 15(f) shows a relative motion trajectory that the grains of the ultrasonic vibration grinding wheel grind the workpiece in the tangential and axial combined direction.
Figure 15B:
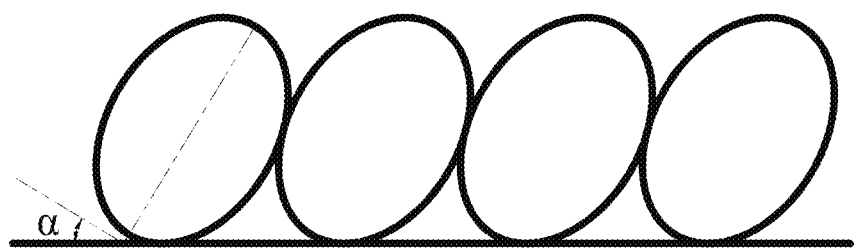
Figure 15C:
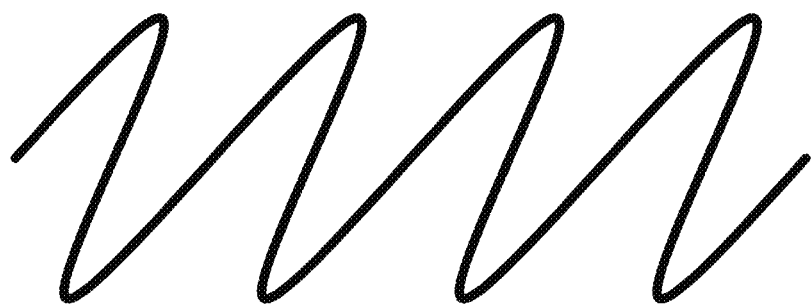
Figure 15D:
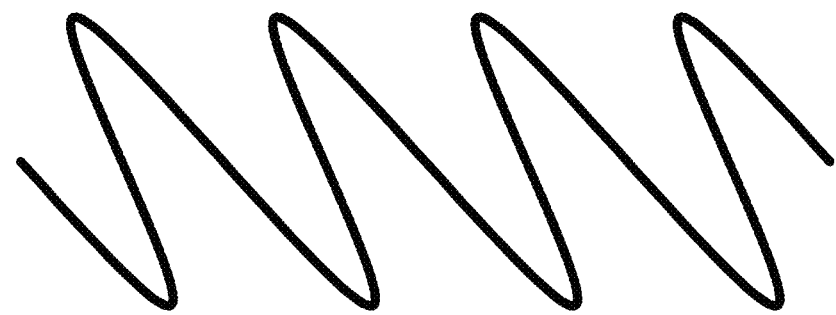
Figure 15E:
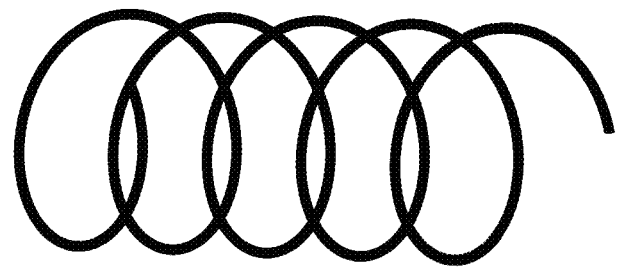
Figure 15F:
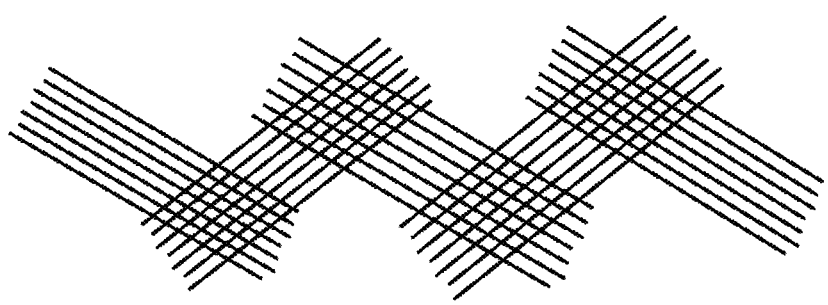

FIG. 15(a) and FIG. 15(b) respectively show a relative motion trajectory of the grains of the grinding wheel and the workpiece in ultrasonic vibration assisted NMQL grinding perpendicular to and parallel to the tangential direction of the midpoint of the contact arc length between the grinding wheel and the workpiece, i.e., an imitated grinding motion trajectory; the relative motion trajectory is also generated by the phase adjustment link in the ultrasonic generator; when the phase difference is π/2, the ultrasonic vibrations perpendicular to and parallel to the tangential direction of the midpoint of the contact arc length between the grinding wheel and the workpiece are coupled, so that the grains of the grinding wheel and the workpiece form an elliptical relative motion trajectory, which forms an imitated grinding motion trajectory together with the feeding direction of the magnetic worktable;

As shown in FIG. 15 (e) and FIG. 15(f), relative to the grinding wheel, the grains of the grinding wheel and the workpiece in ultrasonic vibration assisted NMQL grinding of tangential vibration and axial vibration have totally two relative motion trajectories, respectively an imitated grinding motion trajectory and an imitated honing motion trajectory; the two relative motion trajectories are generated by the phase adjustment link in the ultrasonic generator; when the phase difference is π/2, the tangential ultrasonic vibration is coupled with the axial ultrasonic vibration, so that the grains of the grinding wheel and the workpiece form an elliptical relative motion trajectory, which forms an imitated grinding motion trajectory together with the feeding direction of the magnetic worktable; when the phase difference is 0 and π, the tangential ultrasonic vibration is coupled with the axial ultrasonic vibration, so that the grains of the grinding wheel and the workpiece form a relative motion trajectory of two groups of intersected straight lines, which forms an imitated honing motion trajectory together with the feeding direction of the magnetic worktable.

The specific working process of this solution is as follows:

Taking the second embodiment as an example, the ultrasonic generator III-8 generates ultrasonic frequency electrical signals matching with the power of the transducer I-7 perpendicular to the tangential direction of the midpoint of the contact arc length between the grinding wheel and the workpiece and the transducer I-15 parallel to the tangential direction of the midpoint of the contact arc length between the grinding wheel and the workpiece, and transmits the ultrasonic frequency electrical signals to the transducer I-7 perpendicular to the tangential direction of the midpoint of the contact arc length between the grinding wheel and the workpiece and the transducer I-15 parallel to the tangential direction of the midpoint of the contact arc length between the grinding wheel and the workpiece by the negative lead III-9 and the positive lead III-10. The transducer I-7 perpendicular to the tangential direction of the midpoint of the contact arc length between the grinding wheel and the workpiece and the transducer I-15 parallel to the tangential direction of the midpoint of the contact arc length between the grinding wheel and the workpiece convert the ultrasonic frequency electrical signals into ultrasonic frequency mechanical vibrations, and then transmit the mechanical vibrations to the horns in respective directions. The horns amplify the amplitudes of the ultrasonic frequency mechanical vibrations by certain multiple, and then transmit the mechanical vibrations to the ultrasonic tool head I-24 and the rotatable workpiece fixing table I-22, thereby driving the workpiece I-19 and the grains of the grinding wheel to generate a relative motion trajectory. By controlling the phase adjustment link in the ultrasonic generator III-8 as shown in FIG. 16, the ultrasonic vibrator perpendicular to the tangential direction of the midpoint of the contact arc length between the grinding wheel and the workpiece and the ultrasonic vibrator parallel to the tangential direction of the midpoint of the contact arc length between the grinding wheel and the workpiece generate ultrasonic vibration signals of different phase differences. In the first, third and fourth embodiments, by adjusting the angle of the adjustable rotor I-5 and controlling the ultrasonic generator III-8, the relative motion trajectory of the grinding wheel and the workpiece is further changed and the separation gap is maximum, so that the grains of the imitated grinding and honing motion trajectories are more dense, the grinding fluid can infiltrate the grinding zone more thoroughly, the grinding burn is alleviated, and the desired workpiece surface quality and grinding effect are obtained.

The grinding force generated when the grinding wheel □-3 grinds the workpiece I-19 is transmitted to the dynamometer I-1 through the workpiece clamp I-20. The tangential grinding force, the normal grinding force and the axial grinding force are transmitted to the dynamometer I-1 through three identical paths. The measurement signals are amplified by the amplifier III-3, then transmitted to the grinding force information collector III-2, and finally transmitted to the grinding force controller III-1, and the magnitude of the grinding force is displayed.

The grinding temperature generated when the grinding wheel II-3 grinds the workpiece I-19 is transmitted to the grinding temperature information collector III-5 through the thermocouple III-5, then to the low pass filter III-7 to filter interference signals, and finally to the grinding temperature controller III-6, and the working temperature of the thermocouple III-4, that is, the temperature of the workpiece I-19, is displayed.

After the ultrasonic vibration device completes the experimental machining task, the magnetic worktable II-7 is demagnetized, and the dynamometer I-1 and the entire equipment can be removed.

Figure 17A:
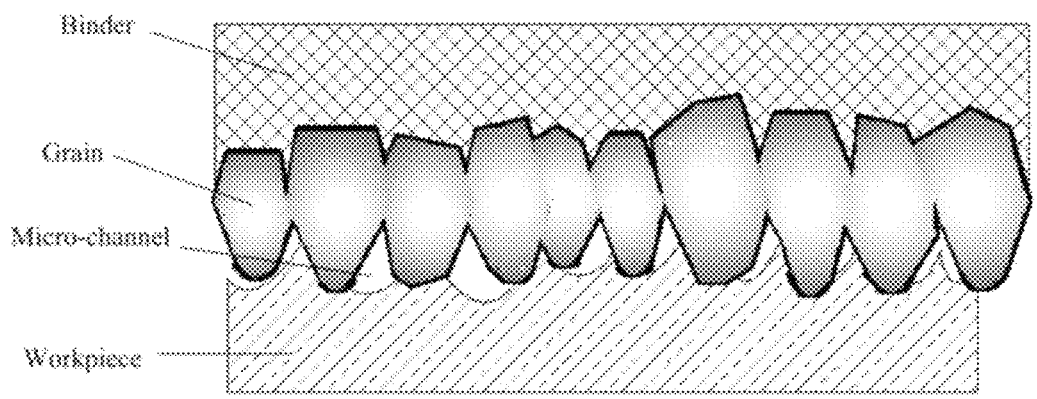
FIG. 17(a) is a schematic view of a micro-channel of a grinding zone when no ultrasonic vibration is applied.
Figure 17B:
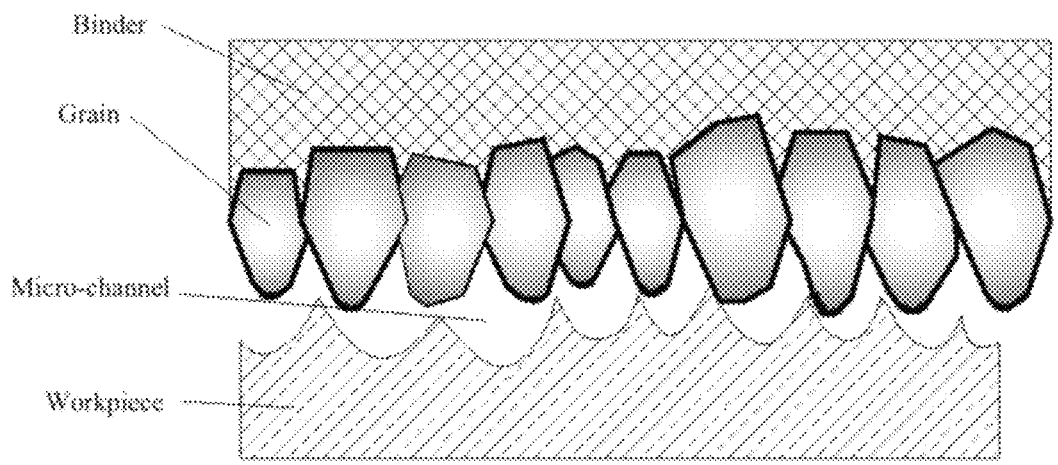
FIG. 17(b) is a schematic view of a micro-channel of a grinding zone when ultrasonic vibration is applied.
Figure 18:
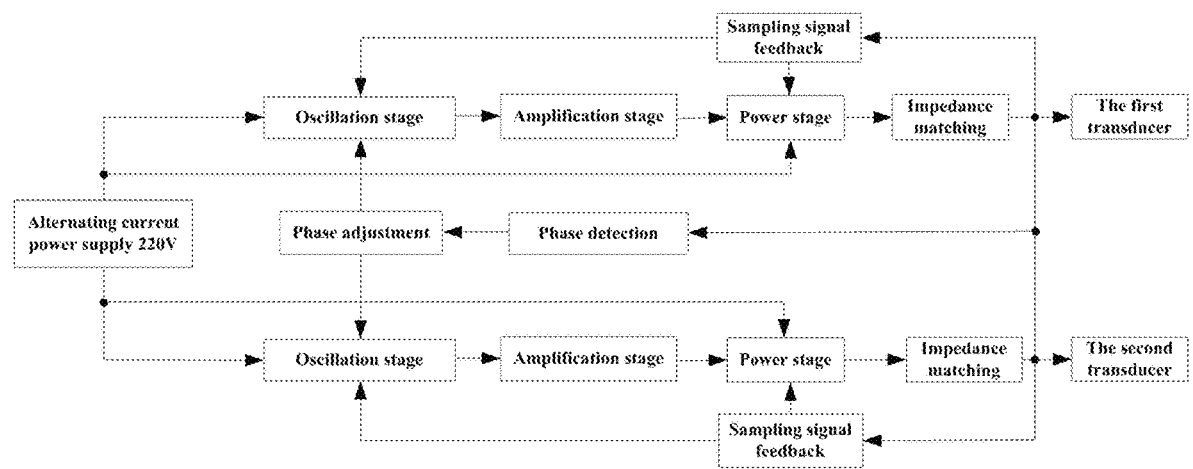
FIG. 18 is a control view of an ultrasonic generator of four embodiments.

The ultrasonic vibration assisted grinding fluid micro-channel infiltration mechanism is as follows:

As shown in FIG. 17(*a*), although a micro-channel is present between the grinding wheel and the workpiece when no ultrasonic vibration is applied, the micro-channel is small, even the condition for forming a micro-channel is not satisfied, and the nanofluid hardly enters the micro-channel to thoroughly infiltrate the grinding wheel and the workpiece. As shown in FIG. 17(*b*), the ultrasonic vibration causes the grinding wheel to be intermittently separated from the workpiece, the amplitude of the ultrasonic vibration is 8~10 μm, and the separation gap between the grinding wheel and the workpiece reaches 8~10 μm, which satisfies the condition of micro-channel infiltration. At the same time, with continuous supply of the nanofluid, when the grinding wheel is separated from the workpiece, the nanofluid enters the micro-channel formed between the grinding wheel and the workpiece by the pumping action when the grinding wheel is separated from the workpiece. The inner wall of the micro-channel is composed of the outer circumferential surface of the grinding wheel and the plowing area of the workpiece, which are non-smooth surfaces, so that the flowability of the nanofluid entering the micro-channel is poor, and a relatively large amount of nanofluid can be stored in the micro-channel to provide sufficient cooling for the grinding before the grinding wheel is separated from the workpiece, and also to provide sufficient lubrication for further grinding. Intermittent cutting and sufficient cooling and lubrication of the grains greatly reduce the grinding heat, solve the surface grinding burn of the workpiece, improve the surface quality of the workpiece, effectively reduce the adhesion of the grinding debris to the grains, and eliminate the blockage of the grinding wheel.

Described above are merely preferred embodiments of the present application, and the present application is not limited thereto. Various modifications and variations may be made to the present application for those skilled in the art. Any modification, equivalent substitution, improvement or the like made within the spirit and principle of the present application shall fall into the protection scope of the present application.

The invention claimed is:

1. An ultrasonic vibration mechanism capable of adjusting a spatial position of ultrasonic vibrators, comprising:
   an arc track base with an arc track at a top;
   an adjustable rotor, the bottom of which is arranged on the arc track, wherein the adjustable rotor can rotate along the arc track;
   a first ultrasonic vibration component, arranged in a center of the adjustable rotor;
   a second ultrasonic vibration component, arranged above a surface of the adjustable rotor through a holder, wherein the second ultrasonic vibration component is parallel to an upper surface of the adjustable rotor, and the second ultrasonic vibration component is arranged perpendicular to the first ultrasonic vibration component; and
   a workpiece fixing table, a bottom of which is in contact with or connected to the first ultrasonic vibration component and the second ultrasonic vibration component to transmit ultrasonic vibration to a workpiece,
   wherein an ultrasonic tool head is arranged at the bottom of the workpiece fixing table, the ultrasonic tool head is fastened to the first ultrasonic vibration component and the second ultrasonic vibration component respectively, a top of the ultrasonic tool head forms an arc surface, and T-shaped groove tracks are formed in the arc surface,
   wherein the arc track and a cylindrical surface where the arc surface formed by the ultrasonic tool head is located are concentric cylindrical surfaces, and
   wherein vibration directions of the first ultrasonic vibration component and of the second ultrasonic vibration component are configured to be changeable along a vertical plane.

2. The ultrasonic vibration mechanism capable of adjusting the spatial position of ultrasonic vibrators according to claim 1, wherein a worm shaft is arranged on the arc track base, and engaging teeth engaging with the worm shaft are arranged on a lower surface of the adjustable rotor.

3. The ultrasonic vibration mechanism capable of adjusting the spatial position of ultrasonic vibrators according to claim 1, wherein the first ultrasonic vibration component comprises a first transducer and a first horn, an ultrasonic vibrator gland is arranged on an outer circumference of the first horn, an ultrasonic vibrator fixing seat is arranged on a surface of the ultrasonic vibrator gland, the ultrasonic vibrator fixing seat is fixed to the surface of the adjustable rotor, and the first transducer is connected with an ultrasonic generator;
   further, a lower surface of the ultrasonic vibrator fixing seat protrudes, and a boss clamping with the lower surface of the ultrasonic vibrator fixing seat is formed on the side or the circumference of the ultrasonic vibrator gland.

4. The ultrasonic vibration mechanism capable of adjusting the spatial position of ultrasonic vibrators according to claim 1, wherein the holder comprises an ultrasonic vibrator holder and an ultrasonic vibrator holder card cover, wherein each of the ultrasonic vibrator holder and the ultrasonic vibrator holder card cover has three joint surfaces combined to be an L-shape, the L-shape joint surfaces of the ultrasonic vibrator holder configured to cooperate with the L-shape joint surfaces of the ultrasonic vibrator holder card cover;
   alternatively, the second ultrasonic vibration component comprises a second transducer and a second horn, the second horn is clamped to the holder, and the second transducer is connected to an ultrasonic generator.

5. The ultrasonic vibration mechanism capable of adjusting the spatial position of ultrasonic vibrators according to claim 1, wherein a side of the arc track base is provided with rotation angle scales;
   alternatively, the arc track is an arc T-shaped track arranged on a surface of the arc track base, and a bottom surface of the adjustable rotor is provided with a T-shaped groove matching with the T-shaped track.

6. A NMQL grinding device of ultrasonic vibration assisted grinding fluid micro-channel infiltration, comprising:
the ultrasonic vibration mechanism capable of adjusting the spatial position of ultrasonic vibrators according to claim 1, wherein a dynamometer is arranged at a bottom of the ultrasonic vibration mechanism, and the mechanism is arranged on a worktable;
a NMQL grinding mechanism, arranged above the workpiece fixing table; and
a grinding force measuring mechanism, comprising the dynamometer and a grinding force controller connected with the dynamometer, wherein the dynamometer is arranged at the bottom of the ultrasonic vibration mechanism.

7. The NMQL grinding device of ultrasonic vibration assisted grinding fluid micro-channel infiltration according to claim 6, further comprising a grinding temperature measuring mechanism, wherein the grinding temperature measuring mechanism comprises a thermocouple arranged on the workpiece fixing table and a grinding temperature controller connected to the thermocouple;
alternatively, a dynamometer spacer is arranged on each of two sides of the dynamometer, and the workpiece fixing table is fixedly connected to the worktable through the dynamometer spacers.

8. The NMQL grinding device of ultrasonic vibration assisted grinding fluid micro-channel infiltration according to claim 6, wherein the NMQL grinding mechanism comprises a grinding wheel, a grinding wheel cover is arranged at an upper half of the grinding wheel, a magnetic chuck is arranged on each of two sides of the grinding wheel cover, a nanofluid delivery pipe penetrates through the magnetic chucks, and a nozzle facing the workpiece is arranged at a bottom of the nanofluid delivery pipe.

\* \* \* \* \*